S. A. Bailey,

Wringer Roll.

No. 2,547. Reissued Apr. 9, 1867.

Witnesses.
Geo. C. Humphrey
I. G. Knight

Inventor.
S. A. Bailey

N. PETERS, PHOTO-LITHOGRAPHER, WASHINGTON, D. C.

United States Patent Office.

THE BAILEY WASHING AND WRINGING MACHINE COMPANY, OF WOONSOCKET, RHODE ISLAND, ASSIGNEES BY MESNE ASSIGNMENTS OF SELDEN A. BAILEY.

*Letters Patent No.* 35,072, *dated April* 29, 1862; *reissue No.* 2,547, *dated April* 9, 1867.

IMPROVEMENT IN WRINGING-MACHINE ROLLER.

The Schedule referred to in these Letters Patent and making part of the same.

TO ALL WHOM IT MAY CONCERN:

Be it known that SELDEN A. BAILEY, then of New London, in the State of Connecticut, heretofore invented certain improvements in the Cylinders for Wringing Machines, for which Letters Patent of the United States were granted to him on the 29th day of April, 1862. Also be it known that the said SELDEN A. BAILEY has, in due form of law, assigned his whole interest in said invention, improvements, and Letters Patent to Bailey, Cook & Co., under date of December 16, 1863, who in turn assigned all their right, title, and interest in the Letters Patent aforesaid to the "Bailey Washing and Wringing Machine Company," on the 22d day of July, 1865. Now, therefore, we, the said "Bailey Washing and Wringing Machine Company," a corporate company doing business at Woonsocket, Rhode Island, assignees, as aforesaid, by virtue of the statute in such case made and provided, do hereby declare the following to be a full and exact description of the invention, reference being had to the annexed drawings, making part of this specification, in which—

Figure 1:
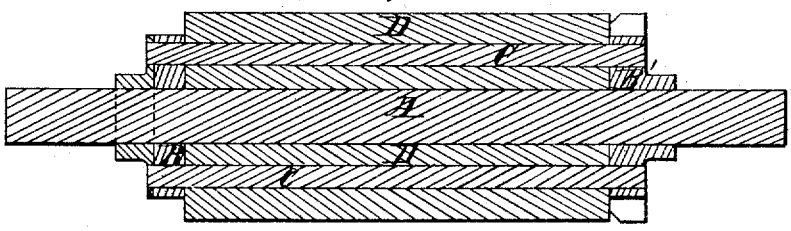
Figure 1 is a longitudinal.
Figure 2:
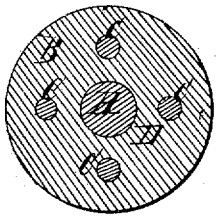
Figure 2 is a transverse section of his improved cylinder for wringing machines.

A is a shaft, furnished at one end with a disk or plate, B, and at the other end with a cog-wheel, B′; or the shaft may be furnished with a disk or cog-wheel at each end. In either case rods, ribs, or bars, C, secured at their ends in any convenient manner to the disks or cog-wheels, extend from one to the other in a direction parallel with the axis of the shaft. The rods, ribs, or bars C may be two or more in number, and act as keys between the shaft and the elastic covering D of the cylinder, which completely surrounds and envelops the shaft and rods, ribs or bars, so that the shaft shall never turn without carrying the covering around with it, thereby preventing the slipping of the covering upon the shaft, and precluding all danger of cutting or tearing of the covering. The elastic covering may be bored out through its centre to receive the shaft, and have the necessary number of longitudinal openings, grooves, or channels of the proper shape and size to receive the rods, ribs, or bars C, over which and the shaft the elastic coverihg D may be drawn or forced, and then be secured by fixing the ends of the rods, ribs, or bars, which had been previously disengaged, in the disk or cog-wheel, as shown; or the elastic covering may be vulcanized upon the shaft and rods, ribs, or bars so as to completely surround and envelop them, (after they have been secured by both ends to the disks or cog-wheels) in a manner familiar to manufacturers of and workers in articles of India rubber.

What we claim as the invention of SELDEN A. BAILEY, and desire to secure by Letters Patent, is—

In elastic cylinders of wringing machines the shaft A in combination with the rods, ribs, or bars C, substantially as and for the purpose set ferth.

S. A. BAILEY,

*General Agent for Bailey Washing and Wringing Machine Company.*

Witnesses:

GUY C. HUMPHRIES,

CHARLES HERRON.